(No Model.)

W. S. WRIGHT.
WHEEL FOR BICYCLES.

No. 299,897. Patented June 3, 1884.

Witnesses
Michael F. X. Foley
John F. Belsterling

Inventor
Wilbur S. Wright
by his attorney
Thomas D. Mowlds

UNITED STATES PATENT OFFICE.

WILBER S. WRIGHT, OF PHILADELPHIA, PENNSYLVANIA, ASSIGNOR TO NEEDHAM M. WILSON, OF SAME PLACE.

WHEEL FOR BICYCLES.

SPECIFICATION forming part of Letters Patent No. 299,897, dated June 3, 1884.

Application filed October 5, 1883. (No model.)

*To all whom it may concern:*

Be it known that I, WILBER S. WRIGHT, a citizen of the United States, residing at Philadelphia, in the county of Philadelphia and State of Pennsylvania, have invented certain new and useful Improvements in Wheels for Bicycles, &c., of which the following is a specification, reference being had therein to the accompanying drawings.

My invention relates to wheels for bicycles, velocipedes, &c.; and the improvements consist in making the felly or rim of an endless piece of vulcanized paper fiber, and the hub of a solid piece of the same material. Vulcanized paper fiber is a substance now well known in the arts, and it consists of a vegetable fiber treated with chloride of zinc or its equivalents, as shown and described in Letters Patent of the United States No. 113,454, of April 4, 1871, and No. 120,380, October 31, 1871, the result of which treatment is the production of the material in sheets of the desired form and size. A felly made of this material is light, strong, tough, and elastic, free from any joint or weld, and a wheel upon which it is placed may be used without any additional protection in the way of a tire of rubber or iron, as is commonly used on bicycle wheels. When using a felly made of this material, the wheel can also be made much lighter and cheaper without impairing its strength or durability. The vulcanized paper fiber being very tough and free from any grain, it is peculiarly adapted for making hubs. While under ordinary circumstances a rim of this material does not require the protection of a tire of any kind whatever, yet, if desired, the ordinary rubber or iron tire can be readily adjusted in the usual manner. The vulcanized-paper-fiber rim or circle may also be advantageously used as a tire over a wood or metal felly, instead of the rubber tire now commonly placed on bicycle-wheels. When used in this way, it will be found to add to the strength, stiffness, and durability of the ordinary wheel constructed with a wood or metal felly, and the wheel can be made lighter, better, and at less cost.

Figure 1:
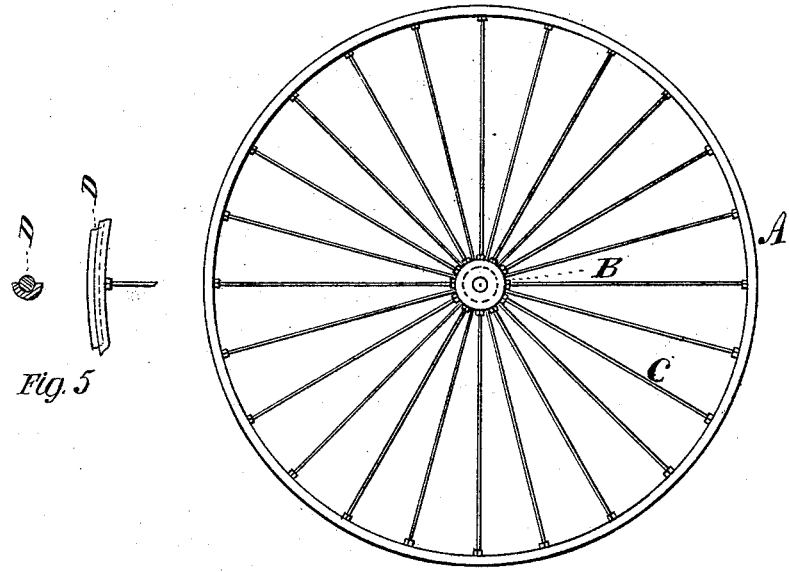
Figure 2:
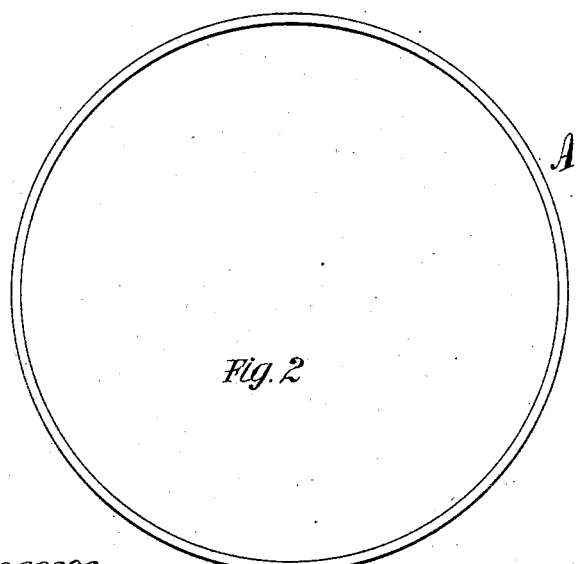
Figure 3:
Figure 4:

In the accompanying drawings, Figure 1 represents a side elevation of my improved wheel, having both the felly and hub made of vulcanized paper fiber. Fig. 2 shows a side elevation of the fiber rim or felly. Figs. 3 and 4 show, respectively, an end and side elevation of the hub. Fig. 5 shows a section of a wheel having the rim of vulcanized paper fiber and the ordinary rubber tire secured thereon.

A is the rim of the wheel; B, the hub.

C are the spokes of the wheel. These spokes are preferably made of steel rods, and may be screwed into the hub and felly or secured by any other suitable or convenient means.

D is the rubber tire shown in the section. (See Fig. 5.)

The rim or felly may be cut from a sheet of the required size or made the proper size and shape by the manufacturer of the fiber.

The wheel may be constructed with either the hub or the felly or both, made of the vulcanized paper fiber, or the wheel can be of the ordinary kind with a tire of vulcanized paper fiber.

The advantages of a rim and hub made of vulcanized fiber have already been outlined. For use upon bicycles and analogous vehicles, the great lightness secured in the use of this material for hub and rim gives a virtue and quality to a wheel thus constructed which no other wheel possesses. The material is exceedingly tough, and, having no grain, is entirely free from splitting or cracking in hub or rim. The rim is endless, and consequently all means for joining the parts used in ordinary wheels are dispensed with.

Having thus described my invention, what I claim as new is—

1. In a bicycle or other wheel provided with spokes, a felly or rim composed of an endless ring of vulcanized fiber, substantially as set forth.

2. In a bicycle or similar wheel, the combination, with the ordinary felly, of an endless rim or tire of vulcanized paper fiber, as set forth.

3. A bicycle or other wheel, consisting of the endless rim A of vulcanized fiber, a hub, B, formed of a single piece of the same material, and the spokes C, substantially as set forth.

In testimony whereof I affix my signature in presence of two witnesses.

WILBER S. WRIGHT.

Witnesses:
 OTIS EGAN,
 THOMAS D. MOWLDS.